(No Model.)
S. GARRARD.
PLANT PROTECTOR.
No. 311,116. Patented Jan. 20, 1885.
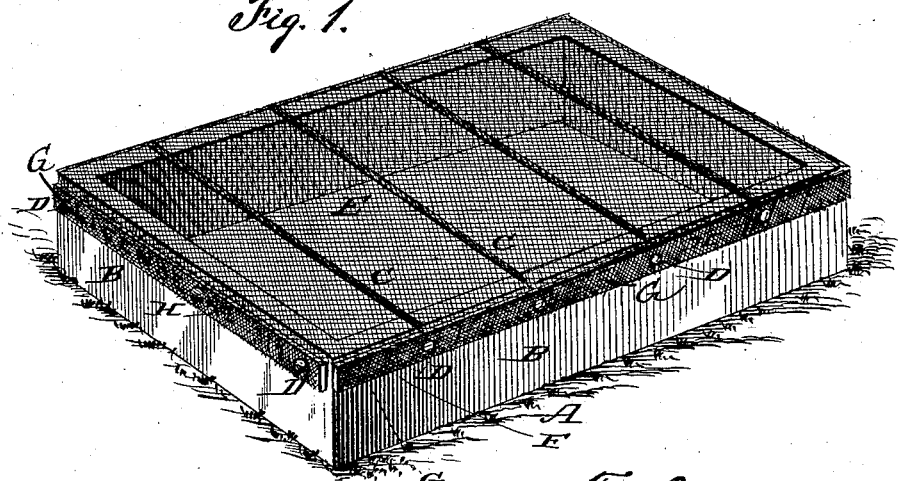
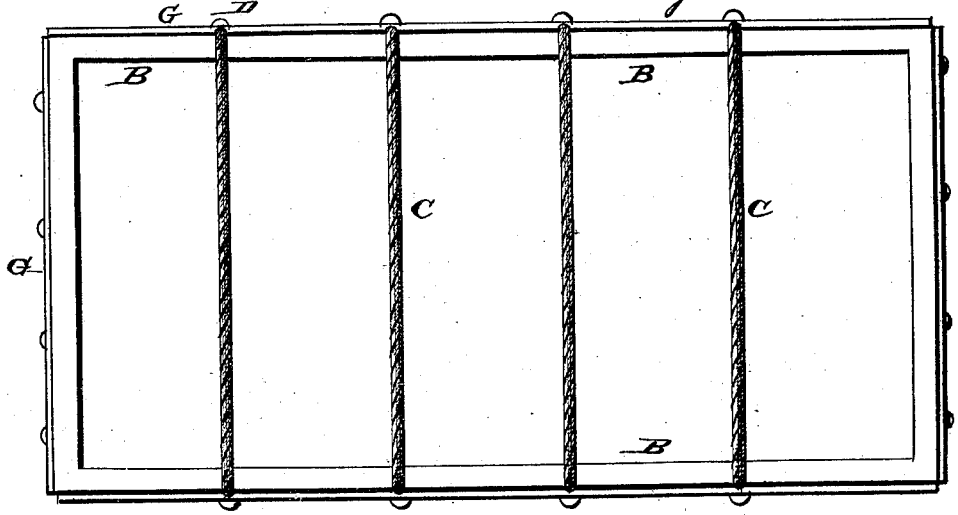
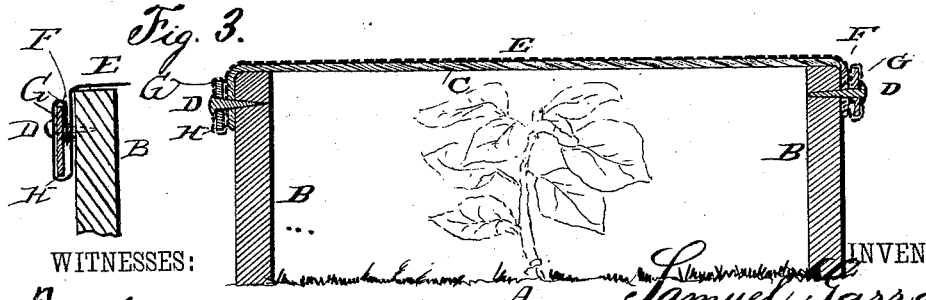
WITNESSES:
Fred. G. Dieterich
Wm. Bagger
INVENTOR.
Samuel Garrard
by Louis Bagger & Co.
ATTORNEYS.

UNITED STATES PATENT OFFICE.

SAMUEL GARRARD, OF DURHAM, NORTH CAROLINA, ASSIGNOR OF ONE-THIRD TO J. W. TATUM, OF SAME PLACE.

PLANT-PROTECTOR.

SPECIFICATION forming part of Letters Patent No. 311,116, dated January 20, 1885.

Application filed May 23, 1884. (No model.)

*To all whom it may concern:*

Be it known that I, SAMUEL GARRARD, a citizen of the United States, and a resident of Durham, in the county of Durham and State of North Carolina, have invented certain new and useful Improvements in Devices for Protecting Tobacco and other Plants; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved bed or frame for the protection of tobacco and other plants, showing the same in position for operation. Fig. 2 is a plan view of the same, parts having been removed for the purpose of showing the construction more clearly; and Fig. 3 is a vertical transverse sectional view.

The same letters refer to the same parts in all the figures.

This invention has reference to an improved device for protecting tobacco and other plants from frost, insects, and other causes of destruction; and it consists, essentially, of a rectangular frame surrounding the bed of plants and covered with muslin or other pervious material, which, while it will protect the young plants from frost and prevent the ingress of insects and other destroyers of crops, will not exclude either rain or sunlight.

My invention comprises the parts arranged in the manner and combination which I shall now proceed more fully to describe.

A in the drawings designates the bed of plants, around which a rectangular or other suitably-constructed frame, B, made of wood or other suitable material, is placed, said frame being either anchored to the ground or placed loosely thereon, in whichever way may be preferred. The upper sides or edges of the said frame are connected by transverse cords or ropes C C, connected to nails D D, attached to the sides of the said frame. These cords serve to support the covering E, which may be made of any textile fabric, and which is secured to the upper sides of the frame, as shown in Fig. 3, the outer portions of the covering being folded over the edges of the frame and then around the fastening-strips G at H and F, when the fastening-nails D will secure the strips and the covering to the frame, the covering being prevented from ripping by being folded around the strips.

From the foregoing description, taken in connection with the drawings hereto annexed, the operation of this invention will be easily understood.

It is obvious that the textile covering will exclude frost as well as insects, birds, and other depredators.

The construction is simple, and the apparatus may be set up easily and inexpensively.

Having thus described my invention, I claim and desire to secure by Letters Patent of the United States—

In a plant-protector, the combination of a frame, a textile screen or cover stretched upon the same, securing-strips arranged in folds at the edges of such textile covering, and suitably attached to the outer side of the frame, at the upper edges of the latter, and transverse supporting-cords arranged across the top of the frame, under the covering of the same, substantially as and for the purpose herein set forth.

In testimony that I claim the foregoing as my own I have hereunto affixed my signature in presence of two witnesses.

SAMUEL GARRARD.

Witnesses:
LUCIUS GREEN,
JNO. C. WILKERSON.